US006831433B2

(12) United States Patent
Furui

(10) Patent No.: US 6,831,433 B2
(45) Date of Patent: Dec. 14, 2004

(54) DRIVE CONTROL APPARATUS

(75) Inventor: Shinichi Furui, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/156,064

(22) Filed: May 29, 2002

(65) Prior Publication Data

US 2002/0195980 A1 Dec. 26, 2002

(30) Foreign Application Priority Data

May 29, 2001 (JP) .................................... P2001-160764

(51) Int. Cl.[7] .................................................. H02P 7/00

(52) U.S. Cl. ....................... 318/432; 318/434; 318/139; 318/671; 318/672; 361/23; 361/88; 361/89

(58) Field of Search ................................ 318/432–434, 318/139, 671, 672; 361/18, 23, 28, 65, 88, 89, 90

(56) References Cited

U.S. PATENT DOCUMENTS

| | | | | | |
|---|---|---|---|---|---|
| 4,287,565 | A | | 9/1981 | Haubner et al. | |
| 4,532,594 | A | | 7/1985 | Hosaka et al. | |
| 4,574,266 | A | * | 3/1986 | Valentine | 340/635 |
| 4,586,179 | A | * | 4/1986 | Sirazi et al. | 714/22 |
| 4,750,128 | A | | 6/1988 | Honda et al. | |
| 4,924,158 | A | * | 5/1990 | Kelley et al. | 318/434 |
| 4,996,964 | A | * | 3/1991 | Ohuchi | 123/479 |
| 5,155,682 | A | * | 10/1992 | Ninoyu | 701/53 |
| 5,224,451 | A | | 7/1993 | Straubel | |
| 5,674,422 | A | * | 10/1997 | Marinus | 219/497 |
| 5,675,231 | A | * | 10/1997 | Becerra et al. | 318/801 |
| 5,723,960 | A | * | 3/1998 | Harada | 318/469 |
| 5,848,366 | A | * | 12/1998 | Ueda | 701/36 |
| 5,936,317 | A | * | 8/1999 | Sasanouchi et al. | 307/10.7 |
| 6,347,028 | B1 | * | 2/2002 | Hausman et al. | 361/93.1 |
| 6,550,870 | B1 | * | 4/2003 | Goodzey | 303/9 |

FOREIGN PATENT DOCUMENTS

| | | |
|---|---|---|
| DE | 198 44 454 A1 | 4/2000 |
| JP | 4-291634 | 10/1992 |

* cited by examiner

*Primary Examiner*—Rina Duda
(74) *Attorney, Agent, or Firm*—Sughrue Mion, PLLC

(57) ABSTRACT

A drive control apparatus comprises a drive signal supply unit for generating, when a power-supply voltage is supplied to the drive control apparatus, a drive signal, which is used for driving a load from this power-supply voltage, and for supplying this generated drive signal to an output port of a microcomputer, a drive signal stop unit for stopping, when the power-supply voltage has a value that is equal to or less than a predetermined value, the drive signal supply unit from supplying the drive signal, and a drive signal delay unit for delaying the drive signal outputted by the drive signal supply unit.

6 Claims, 4 Drawing Sheets

DRIVE CONTROL APPARATUS

BACKGROUND OF THE INVENTION

This invention relates to a drive control apparatus for controlling the driving of a load to be controlled and, more particularly, to a drive control apparatus enabled to drive a load with a simple circuit configuration by performing a backup operation upon occurrence of abnormality of a microcomputer.

Hitherto, a microcomputer fault detection circuit disclosed in JP-A-4-291634 has been provided as a fault detection circuit for detecting a fault of a microcomputer. FIG. 4 shows the configuration of this microcomputer fault detection circuit.

As shown in FIG. 4, a conventional microcomputer fault detection circuit 101 comprises a microcomputer 102, whose fault is to be detected, a reset IC 103 with a watchdog function, which receives a clock signal from this microcomputer 102 and outputs a reset pulse upon occurrence of abnormality, and a detection circuit 104 adapted to output an alarm when reset pulses, the number of which is equal to or more than a predetermined value, are detected.

In the microcomputer fault detection circuit 101 of such a configuration, the microcomputer 102 outputs clock signals, which have equal durations, to the reset IC 103 with the watchdog function at nearly constant periods when normal program processing is performed according to a program loaded thereinto. Further, when some abnormality occurs in the microcomputer 102 and thus the supply of clock pulses is ceased, the reset IC 103 with the watchdog function, which receives the clock signals, outputs a reset pulse every predetermined time period until the supply of clock signals is resumed.

Incidentally, in the case that the microcomputer 102 runs away and the supply of clock signals is completely stopped, the reset IC 103 having the watchdog function continues to output reset pulses. In the detection circuit 104, the reset pulses charge a charging capacitor. When a charging voltage reaches a predetermined level, the detection circuit 104 outputs an output signal as an alarm.

However, although the conventional microcomputer fault detection circuit 101 detects an occurrence of a fault of the microcomputer 102, the circuit 101 cannot drive a load controlled by the microcomputer 102.

Therefore, in the case that the microcomputer 102 is an ECU (Electrical Control Unit) mounted on a vehicle, an additional backup circuit should be provided by using a wire harness so as to drive a load, which is controlled by the microcomputer 102, by performing a fail-safe operation when abnormality occurs in the microcomputer 102. Thus, the conventional microcomputer fault detection circuit 101 has problems in that the cost thereof increases, and that the weight of the vehicle increases.

SUMMARY OF THE INVENTION

The invention is accomplished in view of the foregoing circumstances. Accordingly, an object of the invention is to provide a drive control apparatus enabled not only to detect an occurrence of abnormality of a microcomputer with a simple circuit configuration, but to drive a load controlled by the microcomputer.

To achieve the foregoing object, according to the invention, there is provided a drive control apparatus (hereunder referred to as a first drive control apparatus of the invention), in which a drive circuit performs a drive control operation by performing switching of on/off of a load to be controlled, according to setting of an output port of a microcomputer. This drive control apparatus comprises a drive signal supply unit for generating, when a power-supply voltage is supplied thereto, a drive signal, which is used for driving a load from this power-supply voltage, and for supplying this generated drive signal to the output port of the microcomputer.

This first drive control apparatus of the invention can drive a load by performing a fail-safe operation upon occurrence of abnormality of a microcomputer with a simple circuit configuration that eliminates the necessity for providing an additional backup circuit by using a wire harness.

An embodiment (hereunder referred to as a second drive control apparatus of the invention) of the first drive control apparatus of the invention further comprises a drive signal stop unit for stopping, when the power-supply voltage has a value that is equal to or less than a predetermined value, the drive signal supply unit from supplying the drive signal.

According to the second drive control apparatus of the invention, a load to be imposed on a battery at the time at which the power supply voltage lowers, for example, at an engine start can be reduced.

An embodiment (hereunder referred to as a third drive control apparatus of the invention) of the first or second drive control apparatus of the invention further comprises a drive signal delay unit for delaying the drive signal outputted by the drive signal supply unit.

This third drive control apparatus of the invention can prevent a malfunction of the load at power-on thereof and ensure the safety of a worker.

According to an embodiment (hereunder referred to as a fourth drive control apparatus of the invention) of the first, second or third drive control apparatus of the invention, the drive signal outputted by the drive signal supply unit is supplied to a plurality of drive circuits.

The fourth drive control apparatus of the invention can drive a plurality of loads with a simple circuit configuration, in which a plurality of drive circuits are provided, upon occurrence of abnormality of the microcomputer.

DETAILED DESCRIPTION OF PREFERRED EMBODIMENTS

First, the configuration of a drive control apparatus, which is an embodiment of the invention, is described herein below with reference to FIG. 1.

Figure 1:
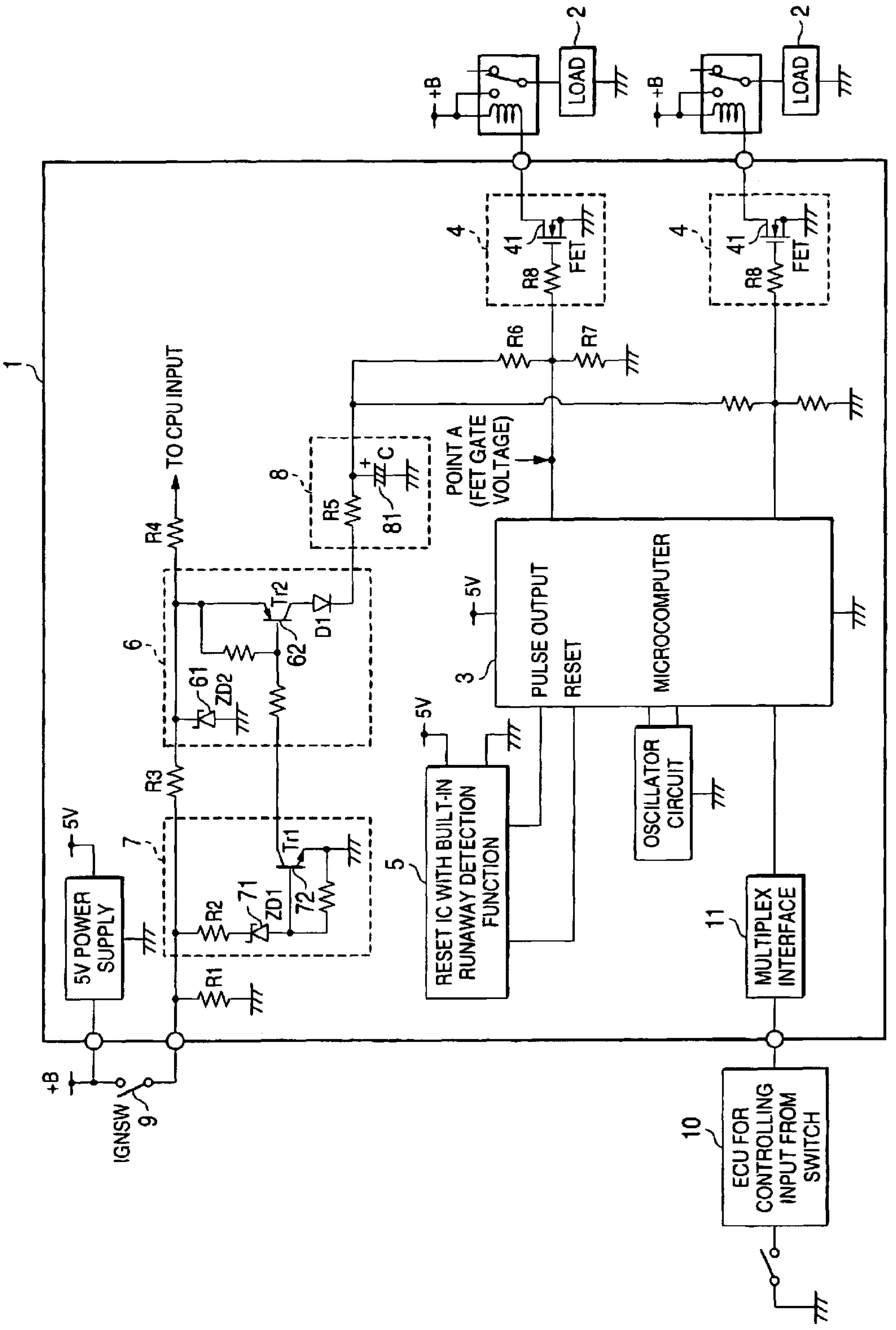
FIG. 1 is a block diagram showing the configuration of an embodiment of a drive control apparatus according to the invention.

As shown in FIG. 1, a drive control apparatus 1 comprises a microcomputer 3 for controlling the driving of a load 2 to be controlled, a drive circuit 4 for receiving a drive signal outputted from this microcomputer 3 and for driving the load 2, a reset IC 5 with a built-in runaway detection function, which is adapted to output a reset pulse upon occurrence of abnormality of the microcomputer 3 by performing a watchdog function, a drive signal supply unit 6 for generating a drive signal from a voltage of a battery serving as a power supply, and for supplying the generated drive signal, a drive signal stop unit 7 for stopping, when the voltage of the battery is equal to or less than a predetermined value, the drive signal supply unit 6 to supply the drive signal, and a drive signal delay unit 8 for delaying the drive signal outputted by the drive signal supply unit. The drive control apparatus 1 is connected to the battery through an ignition switch 9. Further, the microcomputer 3 is connected through a multiplex interface 11 to an ECU (Electrical Control Unit) 10 for controlling an input from the switch.

Incidentally, the drive signal supply unit 6 comprises a zener diode 61 and a transistor 62. The transistor 62 performs switching according to a signal sent from the drive signal stop unit 7, and supplies a signal representing a voltage, which is set at the zener diode 61, as a drive signal.

Further, the drive signal stop unit 7 comprises a zener diode 71 and a transistor 72. When the power-supply voltage is less than a voltage set by the zener diode 71, the drive signal stop unit turns off the transistor 72 and stops the drive signal supply unit 6 to supply the drive signal.

Moreover, the drive signal delay unit 8 comprises a capacitor 81. Drive signals are delayed by this capacitor 81. Incidentally, the capacitor 81 has a time constant that is equal to or more than an oscillation stabilization waiting time of the microcomputer 3.

Furthermore, the drive circuit 4 is constituted by a FET 41. Driving of the load 2 is performed by turning on/off the FET 41 according to a status of an output port of the microcomputer 3 and to a drive signal supplied from the drive signal supply unit 6.

The drive control apparatus 1 of such a configuration is an ECU (Electrical Control Unit) for driving a load, for instance, a headlamp or a motor-fan. The microcomputer 3 for performing a drive control operation controls the driving of the load 2 according to a program loaded thereinto.

Further, as shown in FIG. 1, the drive control apparatus 1 of this embodiment can drive the load 2 by supplying drive signals outputted from the drive signal supply unit 6 to a plurality of the drive circuits 4.

Thus, a plurality of loads can be driven upon occurrence of abnormality of the microcomputer with a simple circuit configuration in which only a plurality of drive circuits are provided.

Next, a load driving operation to be performed by the drive control apparatus 1 according to this embodiment is described with reference to the accompanying drawings.

First, an operation to be performed at the time of turning on the power supply, such as a battery, is described hereinbelow with reference to FIG. 2. Incidentally, the "time of turning on the power supply" includes the case of newly connecting a battery to the apparatus and does not include the case of only turning on the ignition switch 9.

Figure 2:
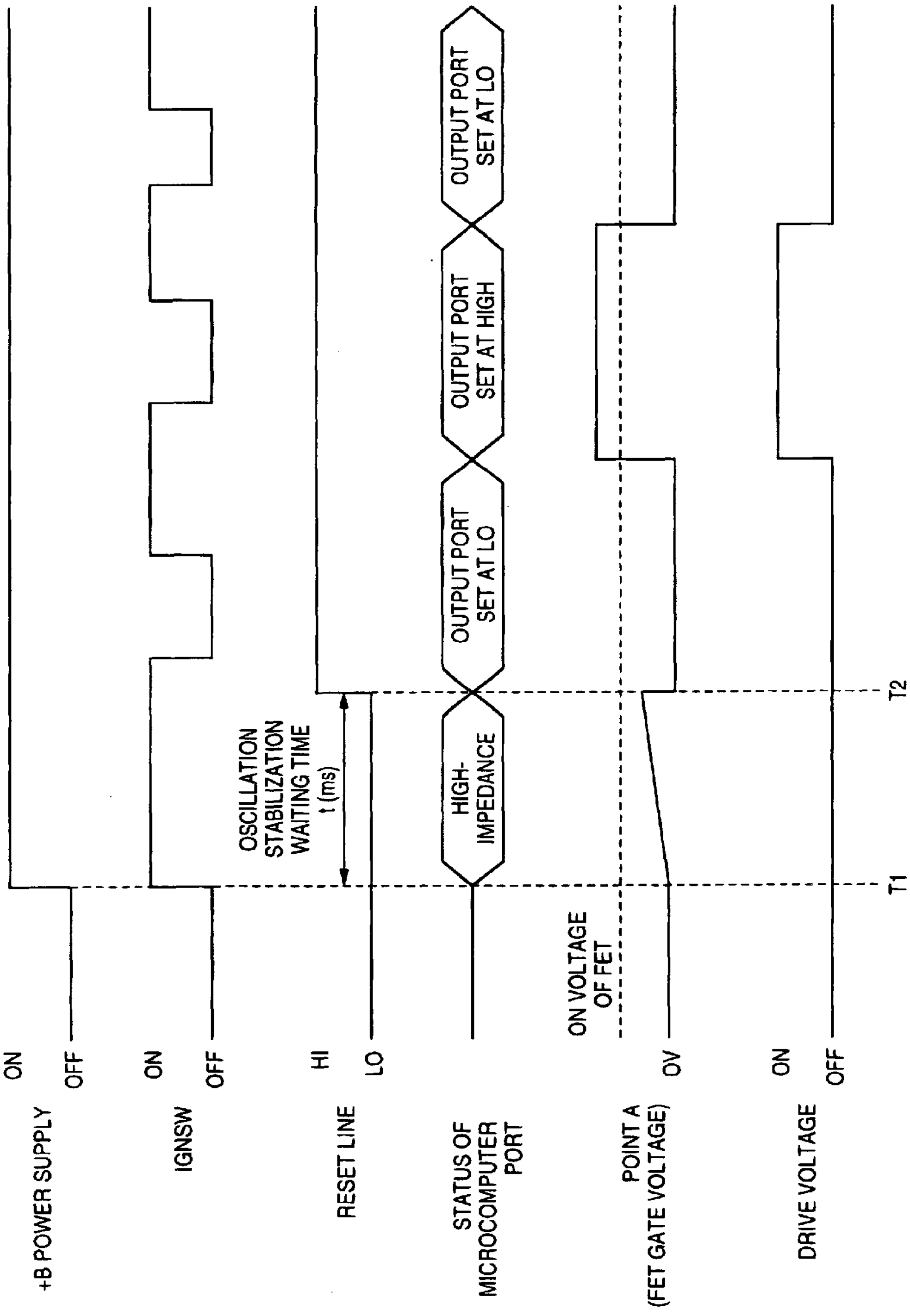
FIG. 2 is a timing chart showing an operation of driving a load at power-on of the drive control apparatus shown in FIG. 1.

As shown in FIG. 2, when the power supply is turned on by newly installing a battery at a time T1, an oscillation stabilization waiting time of a main clock generated by a crystal oscillator occurs in a certain time after the power supply is turned on.

At that time, the signal level of a reset signal outputted from a reset line provided in the microcomputer 3, or the reset IC 5 having a built-in runaway detection function is LO-level. Therefore, the status set at the output port of the microcomputer 3 is a high-impedance status. Thus, when the ignition switch 9 is in an on-state, the power-supply voltage exceeds an operating voltage because of the high-impedance status at the output port. The drive signal supply unit 6 operates at the time T1 and drives the load 2.

However, in this case, a worker performs an operation of installing the battery. Thus, when the load is driven, there is a fear that an accident may occur, for example, a finger of the worker may be cut off by a fan.

Thus, to avert such danger, during the oscillation stabilization waiting time of the microcomputer and during a time period, in which the drive signal is delayed by the drive signal delay unit 8, the drive signal is delayed by the drive signal delay unit 8 so that a voltage at the point A shown in FIG. 1 is prevented from rising to an operating voltage of the FET 41.

This prevents the load 2 from being driven during the oscillation stabilization waiting time of the microcomputer 3. Thus, an occurrence of a malfunction of the load can be prevented. Moreover, the safety of a worker can be ensured.

Thus, the oscillation stabilization waiting time elapses, so that it reaches a time T2. Then, when the microcomputer 3 starts performing a normal operation, the status of the output port of the microcomputer 3 is changed from the high-impedance status to a status in which the potential level at the output port is set at either of LO-level and HI-level.

At that time, in the case that the level at the output port of the microcomputer 3 becomes HI-level, the voltage level at the point A exceeds the operating voltage of the FET 41 owing to the potential caused by a signal sent from this or by the drive signal supplied from the drive signal supply unit 6. Thus, the drive circuit 4 is turned on, and the load 2 is driven.

Further, in the case that the level at the output port of the microcomputer 3 becomes LO-level, even when the ignition switch 9 is turned on and a drive signal is supplied from the drive signal supply unit 6, the potential due to the drive signal is absorbed into the output port. Thus, the potential level at the point A becomes an off-level, so that the load 2 is not driven by the drive circuit 4.

Thus, the drive control apparatus 1 of this embodiment causes the drive signal delay unit 8 to delay the drive signal by the oscillation stabilization waiting time at power-on. Thus, an occurrence of a malfunction of the load can be prevented. Moreover, the safety of a worker can be ensured.

Next, a drive control operation to be performed on a load by the drive control apparatus 1 of this embodiment upon occurrence of abnormality is described hereinbelow with reference to FIG. 3.

Incidentally, the "abnormality of the microcomputer 3" to be referred to herein is defined as a state in which the high-impedance status of the output port continues in spite of setting the output port in such a way as to output a signal. Possible examples of such abnormality are the cases that the microcomputer maintains a latch-up condition owing to radio disturbance and static electricity, that because of stopping the supply of the main clock, the reset IC 5 with the built-in runaway detection function continues to output reset signals, that an open fault of the port occurs owing to defective soldering, and that input setting is fixed owing to the failure of a register.

Figure 3:
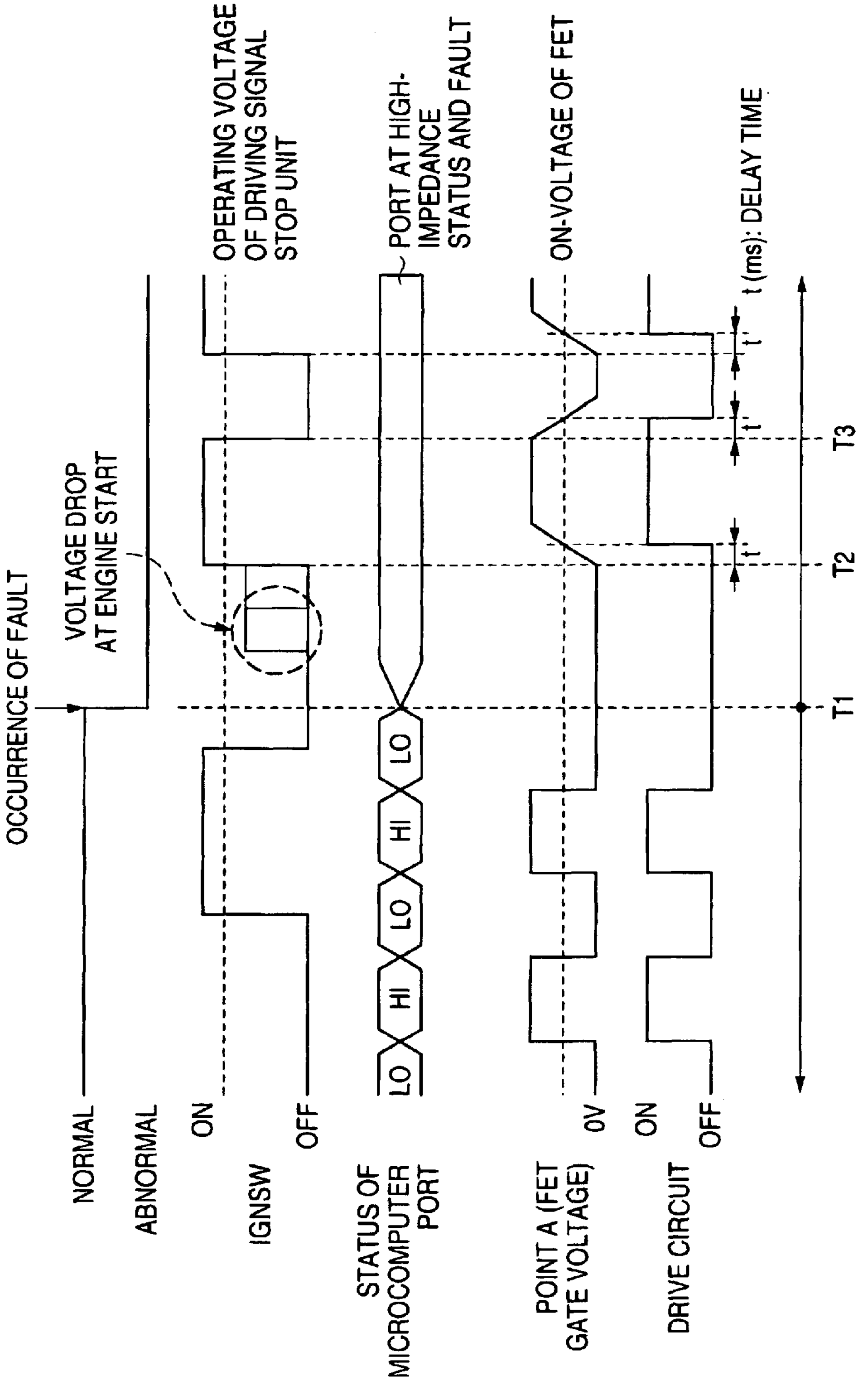
FIG. 3 is a timing chart showing an operation of driving a load in the drive control apparatus shown in FIG. 1.
Figure 4:
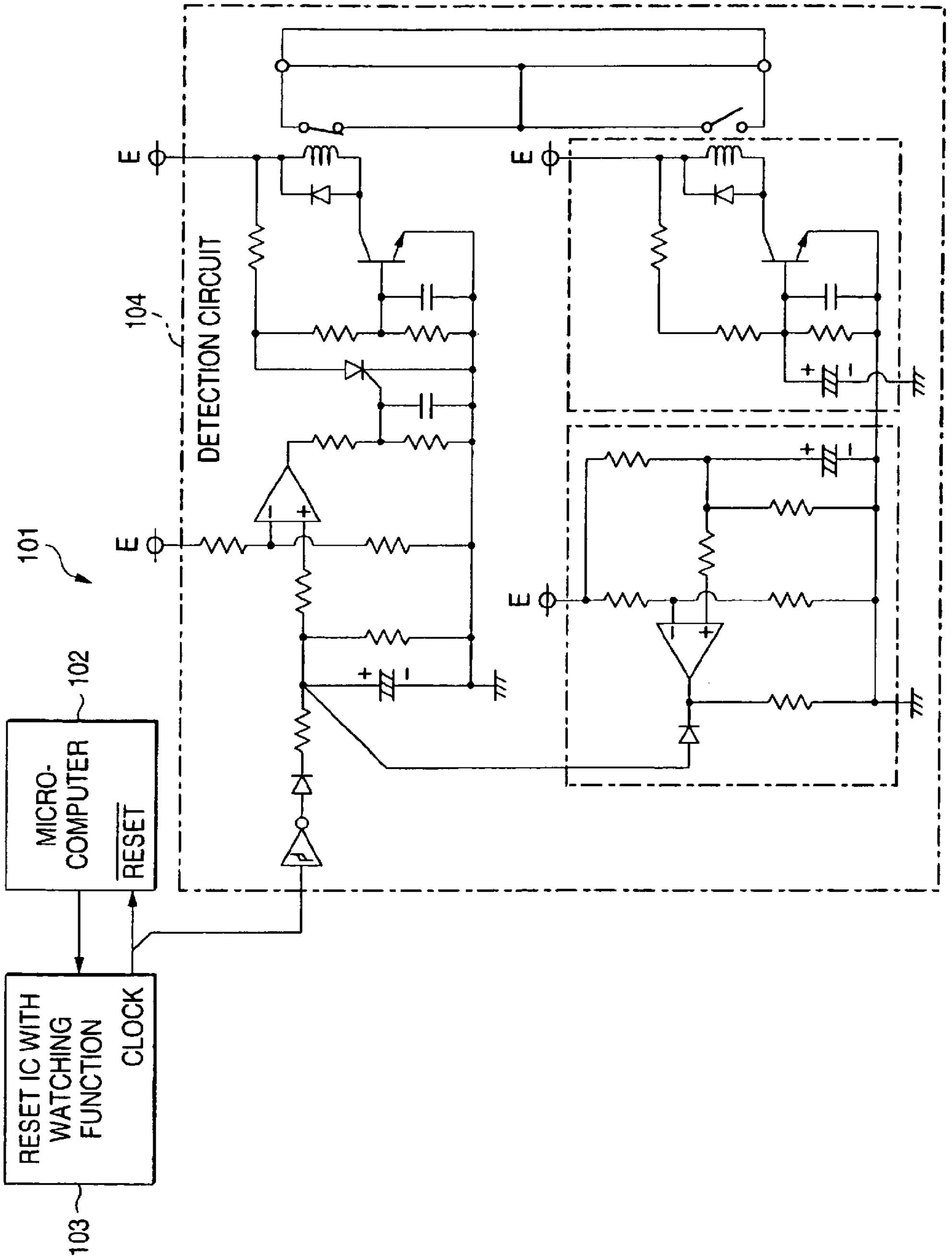
FIG. 4 PRIOR ART
FIG. 4 is a circuit diagram showing the configuration of a conventional microcomputer fault detection circuit.

Thus, first, when the microcomputer 3 normally operates before the time T1 as shown in FIG. 3, the voltage at the point A illustrated in FIG. 1 changes according to the setting of the output port of the microcomputer 3 regardless of the ON/OFF of the ignition switch 9. Thus, the FET 41 of the drive circuit 4 is turned on or off to thereby drive the load 2.

Further, in the case that a failure occurs in the microcomputer 3 and thus the output port thereof is put into a high-impedance status at the time T1, the voltage at the point A remains at an off-level and does not rise when the ignition switch 9 is turned off.

When the ignition switch 9 is turned on at that time, the power-supply voltage is supplied to the drive signal supply unit 6. However, when the load is driven during the power-supply voltage is reduced, for instance, at an engine start, the load imposed on the battery is large. Thus, when the power-supply voltage does not reach a predetermined value, the supply of the drive signal is stopped by the drive signal stop unit 7, so that the load is not driven.

Then, in the case that the power-supply voltage exceeds a predetermined at the time T2, the stop of the supply, which is caused by the drive signal stop unit 7, is canceled. Then, the drive signal supply unit 6 operates and starts the supply of a drive signal, so that the voltage at the point A starts rising.

Then, when the voltage at the point A exceeds the operating voltage of the FET 41 of the drive circuit 4, the drive circuit 4 is turned on. Thus, the load 2 is driven.

Subsequently, in the case that the ignition switch 9 is turned off at a time T3, the voltage at the point A gradually drops. When the voltage at the point A falls below the operating voltage of the FET 41 of the drive circuit 4, the drive circuit 4 is turned off, so that the driving of the load 2 is stopped.

At that time, the drive signal delay unit 8 causes a delay of a period t.

Thus, according to the drive control apparatus 1 of this embodiment, even upon occurrence of abnormality of the microcomputer 3, the drive signal supply unit 6 supplies drive signals according to the on/off of the ignition switch 9. Consequently, the drive control apparatus 1 can drive the load 2 even upon occurrence of abnormality of the microcomputer 3.

Furthermore, this embodiment eliminates the necessity for providing an additional backup circuit therein by using a wire harness. Thus, this embodiment achieves not only the detection of an occurrence of abnormality of the microcomputer with a simple circuit configuration but the driving of a load by performing a fail-safe operation.

Additionally, when the power supply voltage is less than a predetermined value, the drive signal supply unit 6 is stopped by the drive signal stop unit 7. Thus, the load to be imposed on the battery at the time at which the power supply voltage is dropped, for example, at an engine start can be reduced.

As described above, the drive control apparatus according to the invention can drive a load by performing a fail-safe operation upon occurrence of abnormality of a microcomputer with a simple circuit configuration that eliminates the necessity for providing an additional backup circuit by using a wire harness.

What is claimed is:

1. A drive control apparatus comprising:

a microcomputer including an output port for controlling a drive circuit;

the drive circuit for switching on/off a load according to a setting of the output port of the microcomputer; and a drive signal supply unit for generating, when a power-supply voltage is supplied to the drive signal supply unit, a drive signal used for driving the load from the power-supply voltage, and for supplying the generated drive signal to the output port of the microcomputer.

2. The drive control apparatus according to claim 1 further comprising a drive signal stop unit for stopping, when the power-supply voltage has a value that is equal to or less than a predetermined value, the drive signal supply unit from supplying the drive signal.

3. The drive control apparatus according to claim 1 further comprising a drive signal delay unit for delaying the drive signal outputted by the drive signal supply unit.

4. The drive control apparatus according to claim 1, wherein the drive signal outputted from the drive signal supply unit is supplied to a plurality of the drive circuits.

5. The drive control apparatus according to claim 1, wherein the drive signal outputted from the drive signal supply unit is not supplied to an input port of the microcomputer.

6. The drive control apparatus according to claim 1, further comprising a runaway detection circuit, provided separately from the drive signal supply circuit, which outputs a reset pulse upon occurrence of an abnormality of the microcomputer.

* * * * *